United States Patent
Kato

(10) Patent No.: US 12,553,977 B2
(45) Date of Patent: Feb. 17, 2026

(54) DIRECTION DETECTION DEVICE, ACQUISITION METHOD OF PHASE DIFFERENCE TABLE, DIRECTION DETECTION METHOD, AND DIRECTION DETECTION PROGRAM

(71) Applicant: MITSUBISHI HEAVY INDUSTRIES, LTD., Tokyo (JP)

(72) Inventor: Noriyasu Kato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 398 days.

(21) Appl. No.: 18/266,465

(22) PCT Filed: Jan. 13, 2022

(86) PCT No.: PCT/IB2022/050234
§ 371 (c)(1),
(2) Date: Jun. 9, 2023

(87) PCT Pub. No.: WO2022/123549
PCT Pub. Date: Jun. 16, 2022

(65) Prior Publication Data
US 2023/0384409 A1 Nov. 30, 2023

(51) Int. Cl.
*G01S 3/48* (2006.01)
(52) U.S. Cl.
CPC ................ *G01S 3/48* (2013.01)
(58) Field of Classification Search
CPC ........................................ G01S 3/48
(Continued)

(56) References Cited

U.S. PATENT DOCUMENTS 6,894,640 B1 5/2005 Hager et al.
2007/0182619 A1* 8/2007 Honda ............... H01Q 25/02
342/149

(Continued)

FOREIGN PATENT DOCUMENTS

JP 2008-76095 4/2008
JP 2009-264968 11/2009
(Continued)

OTHER PUBLICATIONS

Written Opinion of the International Searching Authority issued Mar. 15, 2022 in International (PCT) Application No. PCT/IB2022/050234, with English-language translation.

(Continued)

*Primary Examiner* — Bo Fan
(74) *Attorney, Agent, or Firm* — Wenderoth, Lind & Ponack, L.L.P.

(57) ABSTRACT

A direction detection device that detects an arrival direction of a received wave includes: antennas arrayed in at least a one-dimensional direction; a phase difference imparting unit that imparts phase differences different depending on arrival directions of received waves; a storage unit that stores therein a phase difference table in which for each of combinations of two antennas, a phase difference between the two antennas is associated with an arrival direction of a received wave; a detector that detects a phase difference between two antennas based on the received wave; an extractor that extracts, for the combinations of two antennas, arrival directions of the received wave corresponding to the phase difference detected by the detector; and a comparator that compares the arrival directions of the received wave corresponding to the phase differences to acquire a matched arrival direction of the received wave as a detection result.

12 Claims, 13 Drawing Sheets

(58) Field of Classification Search
USPC .................. 342/149, 357.46, 357.55, 442
See application file for complete search history.

(56) References Cited

U.S. PATENT DOCUMENTS

2016/0248152 A1* 8/2016 Takao .................. H01Q 1/3291
2019/0041493 A1* 2/2019 Greenberg .............. G01S 7/026
2019/0064312 A1   2/2019 Jeon et al.

FOREIGN PATENT DOCUMENTS

| JP | 2010-8319    | 1/2010 |
| JP | 2010-133907  | 6/2010 |
| JP | 2016-156734  | 9/2016 |
| JP | 2019-507357  | 5/2017 |
| WO | 2006/009122  | 1/2006 |

OTHER PUBLICATIONS

International Search Report issued Mar. 15, 2022 in International (PCT) Application No. PCT/IB2022/050234.

* cited by examiner

A-A

B-B

PHASE DIFFERENCE BETWEEN ANTENNA 1 AND ANTENNA 2

PHASE DIFFERENCE BETWEEN ANTENNA 1 AND ANTENNA 3

DIRECTION DETECTION DEVICE, ACQUISITION METHOD OF PHASE DIFFERENCE TABLE, DIRECTION DETECTION METHOD, AND DIRECTION DETECTION PROGRAM

FIELD

The present disclosure relates to a direction detection device for detecting a received-wave arrival direction, an acquisition method of a phase difference table, a direction detection method, and a direction detection program.

BACKGROUND

Conventionally, as direction detection devices, angle measurement processing devices have been known that calculate the arrival direction of signals of received wave or the like (refer to Patent Literature 1, for example). The angle measurement processing device includes a plurality of antenna elements and a radome that covers the antenna elements. The angle measurement processing device calculates an arrival direction of an incoming signal using the incoming signals received by the antenna elements.

CITATION LIST

Patent Literature

Japanese Patent Application Laid-open No. 2010-133907

SUMMARY

Technical Problem

When the received-wave arrival direction is detected using a phase difference between a plurality of antennas, ambiguity may occur. Ambiguity is a phenomenon that a plurality of candidates for the received-wave arrival direction are calculated in accordance with a relation between a distance between the antennas, and a wavelength of the received wave, even if the phase difference acquired between the antennas is the same. The ambiguity that occurs changes according to the distance between the antennas. Thus, in order to eliminate the ambiguity, it is common to use the plurality of the antennas in which the distances between the antennas are unequal.

When a plurality of the antennas are lined up in one direction (for example, in the azimuth direction (also known as AZ direction)), the antennas can detect the received-wave arrival direction in a plane (two-dimensional) that includes one direction. Thus, in order to detect a three-dimensional received-wave arrival direction, it is necessary to line up the antennas in one direction and also line up in another direction that intersects the one direction (for example, in an elevation angle direction (also known as EL direction)), that is, it is necessary to array the antennas in a two-dimensional manner.

However, the antennas installed in the inner space of the radome may be difficult to be arrayed in a two-dimensional manner due to spatial restrictions of the radome, in some cases. When the antennas are lined up in only one dimensional direction due to the spatial restrictions of the radome, the received-wave arrival direction in the plane including that direction can be calculated from the phase difference between the antennas, but in the other direction intersecting the one direction, the received-wave arrival direction cannot be calculated using the phase difference because there are no plurality of the antennas.

Thus, the present disclosure addresses the problem of providing a direction detection device, an acquisition method of a phase difference table, a direction detection method, and a direction detection program that can detect the received-wave arrival direction in a suitable manner while removing ambiguity, even if there are restrictions on the installation of antennas in the radome.

Solution to Problem

A direction detection device according to the present disclosure detects an arrival direction of a received wave, and includes: a plurality of antennas that are arrayed in at least a one-dimensional direction to receive the received wave; a phase difference imparting unit that imparts phase differences different depending on arrival directions of received waves to the antennas; a storage unit that stores therein a phase difference table in which for each of combinations of two antennas among the antennas, a phase difference between the two antennas is associated with an arrival direction of a received wave; a detector that detects a phase difference between two antennas based on the received wave received at the antennas; an extractor that extracts, for the combinations of two antennas, a plurality of arrival directions of the received wave corresponding to the phase differences detected by the detector from the phase difference table stored in the storage unit; and a comparator that compares the arrival directions of the received wave corresponding to the phase differences acquired from the extractor to acquire a matched arrival direction of the received wave as a detection result.

An acquisition method of a phase difference table according to the present disclosure is for acquiring the phase difference table used in the above-described direction detection device. The method includes the steps of: setting the received wave generated from a radio wave source for a plurality of antennas that are arrayed in at least a one-dimensional direction, to be in a predetermined arrival direction; generating the received wave from the radio wave source; receiving the received wave at the antennas; and acquiring, based on a phase difference acquired by receiving the received wave, a phase difference table in which the phase difference between two antennas is associated with an arrival direction of the received wave.

A direction detection method according to the present disclosure is for detecting an arrival direction of a received wave by the above-described direction detection device. The method includes the steps of: receiving the received wave by a plurality of antennas that are arrayed in at least a one-dimensional direction; detecting, by the detector, a phase difference between two antennas based on the received wave received at the antennas; extracting, by the extractor, for combinations of two antennas, a plurality of arrival directions of the received wave corresponding to the phase differences detected by the detector from the phase difference table stored in the storage unit; and comparing, by the comparator, the arrival directions of the received wave corresponding to the phase differences acquired to acquire a matched arrival direction of the received wave as a detection result.

A direction detection program according to the present disclosure is for detecting an arrival direction of a received wave to be executed by the above-described direction detection device. The program causes the direction detection device to execute the steps of: receiving the received wave by a plurality of antennas that are arrayed in at least a one-dimensional direction; detecting, by the detector, a phase difference between two antennas based on the received wave received at the antennas; extracting, by the extractor, for combinations of two antennas, a plurality of arrival directions of the received wave corresponding to the phase differences detected by the detector from the phase difference table stored in the storage unit; and comparing, by the comparator, the arrival directions of the received wave corresponding to the phase differences acquired to acquire a matched arrival direction of the received wave as a detection result.

Advantageous Effects of Invention

According to the present disclosure, it is possible to suitably detect the received-wave arrival direction in dimensions that could not be conventionally acquired while removing ambiguity, even if there are restrictions on the installation of antennas in the radome.

DESCRIPTION OF EMBODIMENTS

The following describes in detail the embodiments according to the present disclosure on the basis of the drawings. The invention is not limited by these embodiments. The components in the following embodiments include those replaceable and easy to be replaced by those skilled in the art, or those that are substantially the same. Furthermore, the components described below can be combined as appropriate, and if there are more than one embodiment, each of the embodiments can be combined one another.

First Embodiment

A direction detection device 1 and a direction detection method according to the first embodiment are a device and a method for detecting a received-wave arrival direction. The received wave is a radio wave, for example, a beam of a detection radar. The direction detection device 1 is disposed in transportation machinery such as aircraft, vehicles, or ships, for example. The received-wave arrival direction is determined by the angle (AZ angle) in the azimuth direction (hereinafter referred to as AZ) and the angle (EL angle) in the elevation direction (hereinafter referred to as EL).

Figure 1:
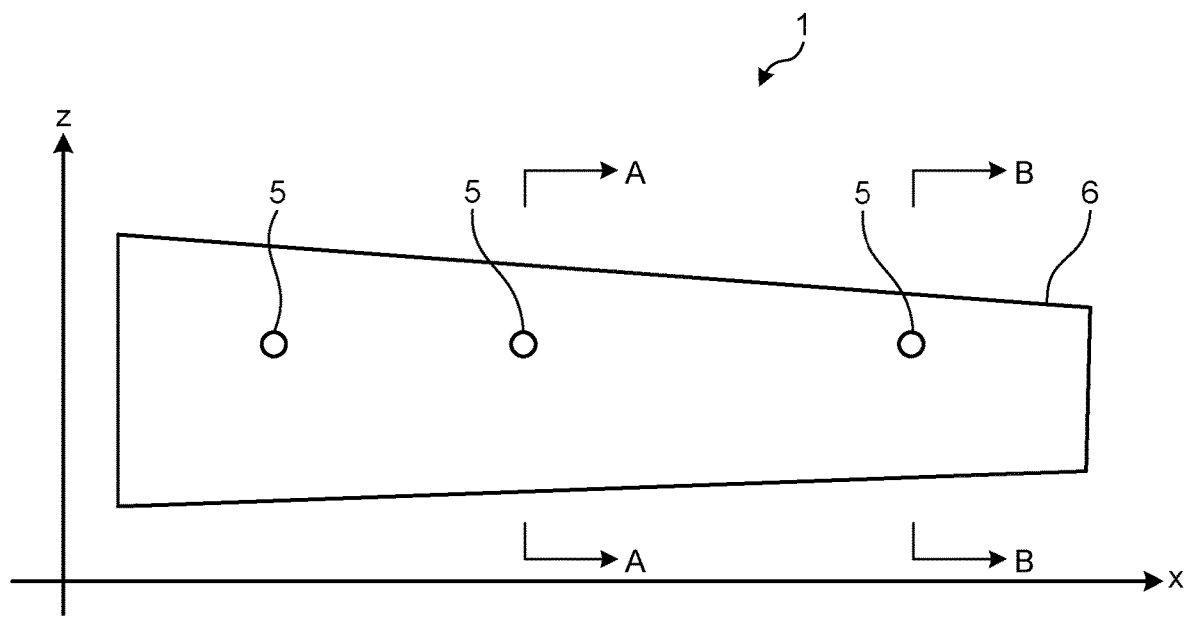
FIG. 1 is a schematic diagram of part of the direction detection device according to a first embodiment.
Figure 2:
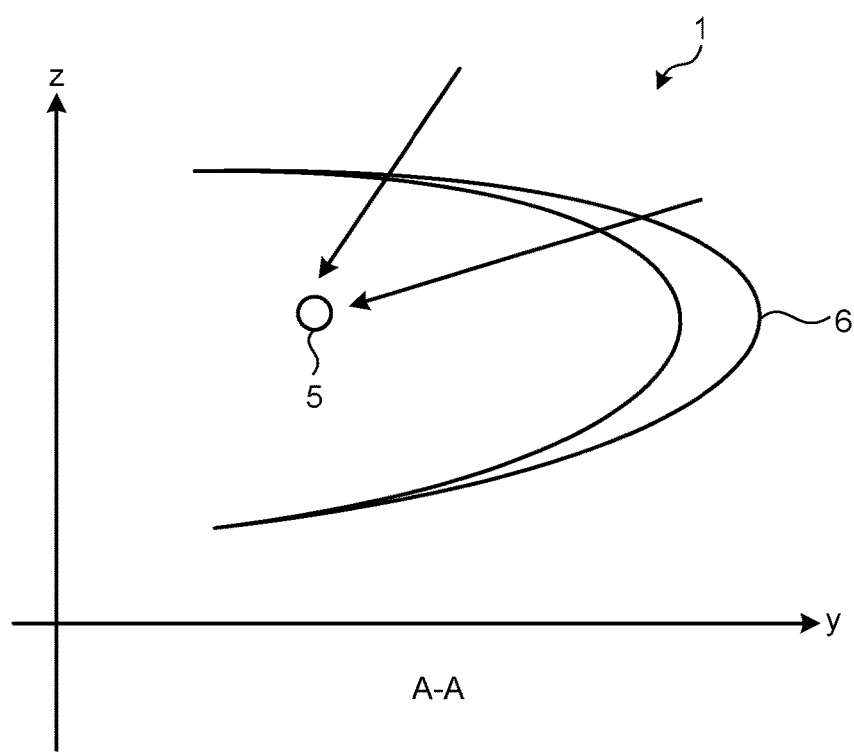
FIG. 2 is an A-A cross-section of FIG. 1.
Figure 3:
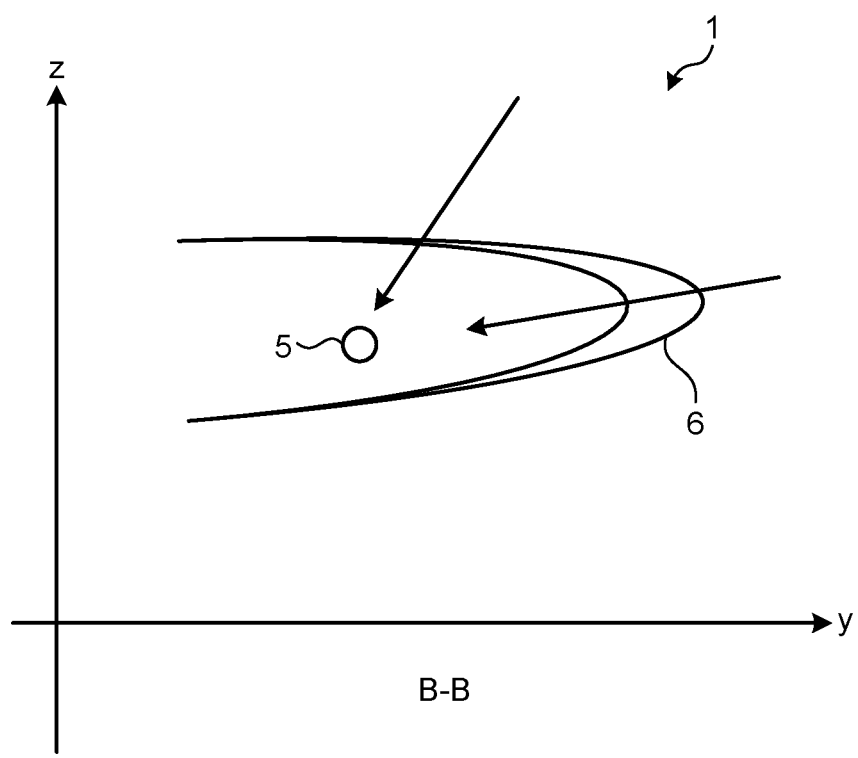
FIG. 3 is a B-B cross-section of FIG. 1.
Figure 4:
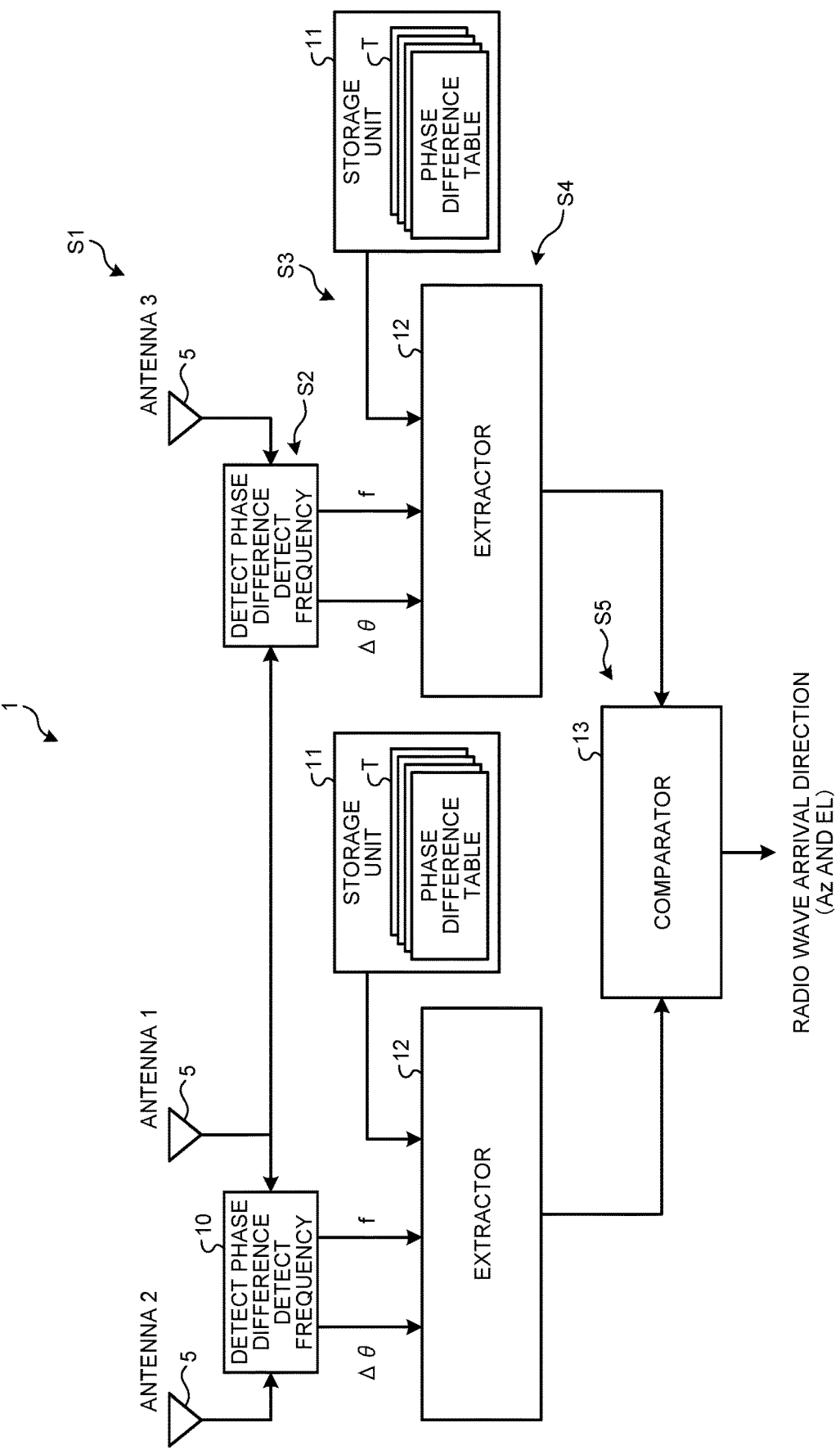
FIG. 4 is an explanatory diagram relating to the direction detection device and a direction detection method according to the first embodiment.
Figure 5:
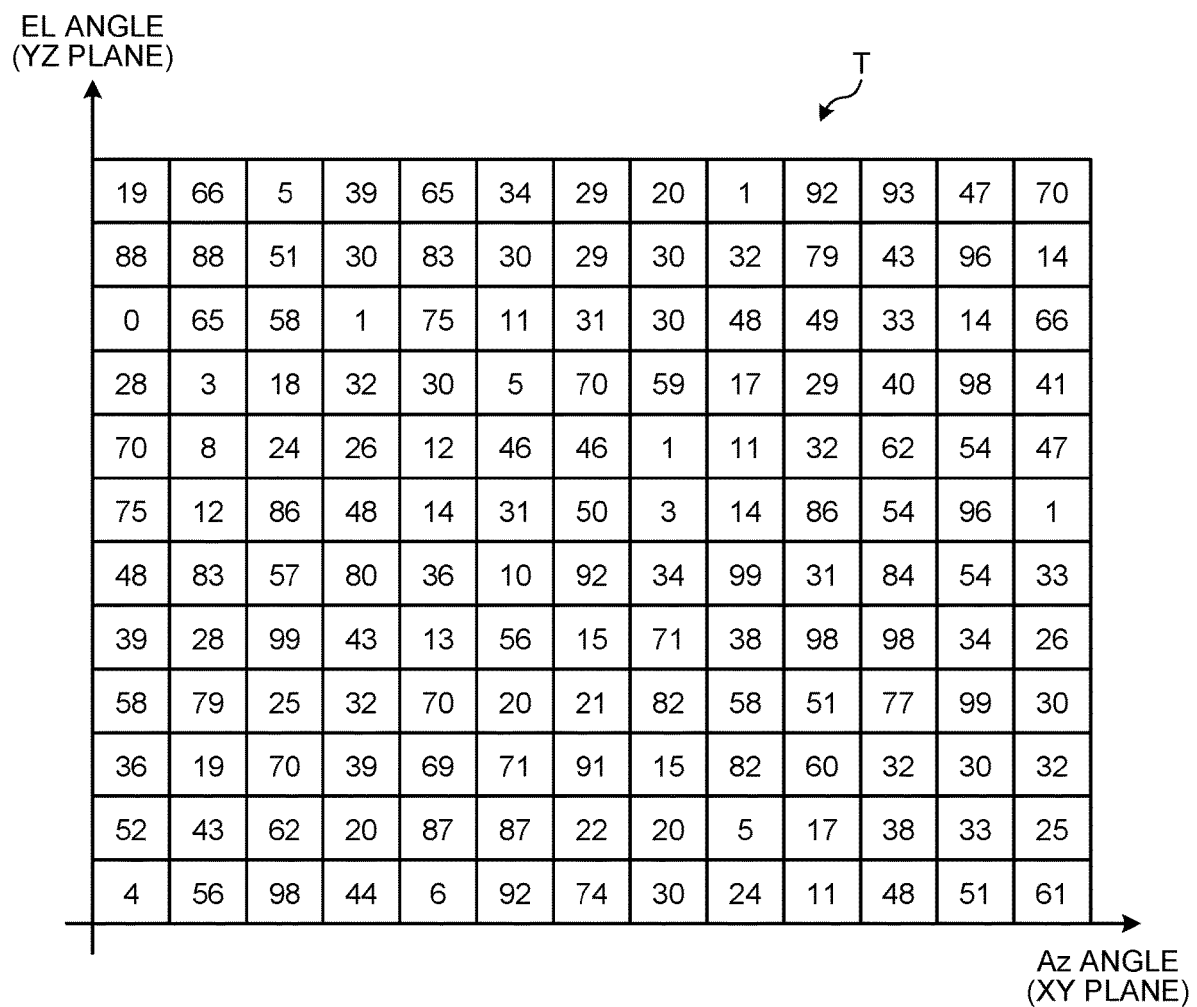
FIG. 5 is a diagram of a phase difference table.
Figure 6:
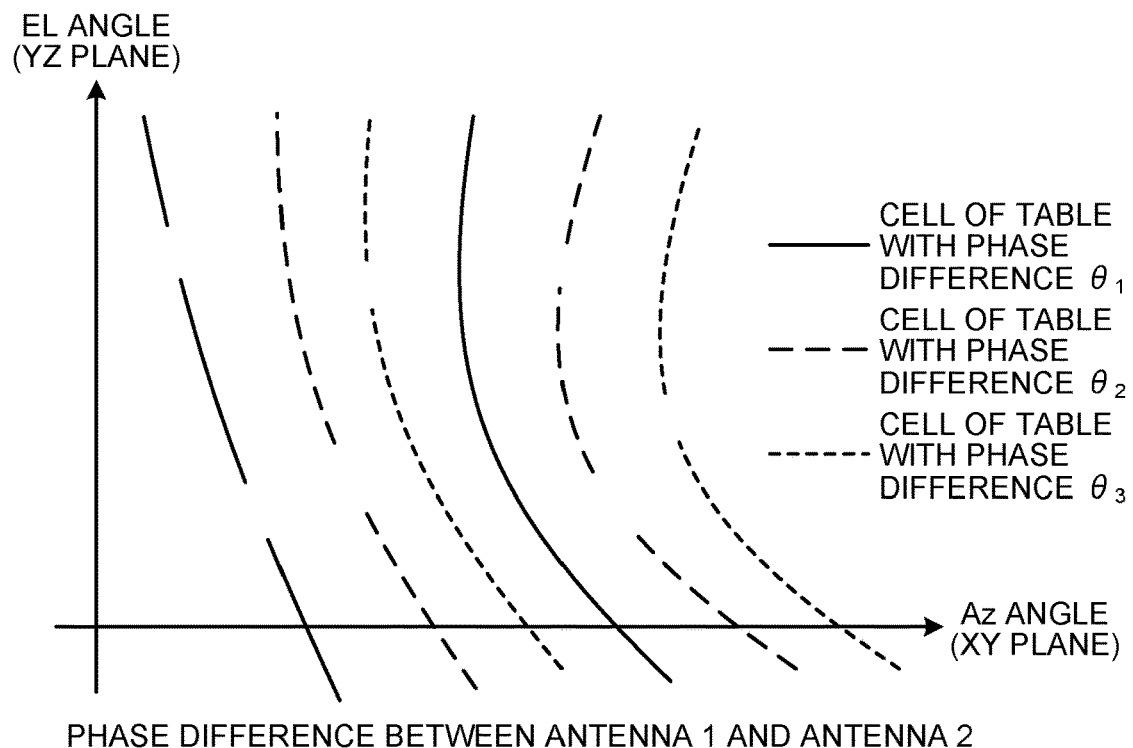
FIG. 6 is a graph indicating an example of the phase difference table.
Figure 7:
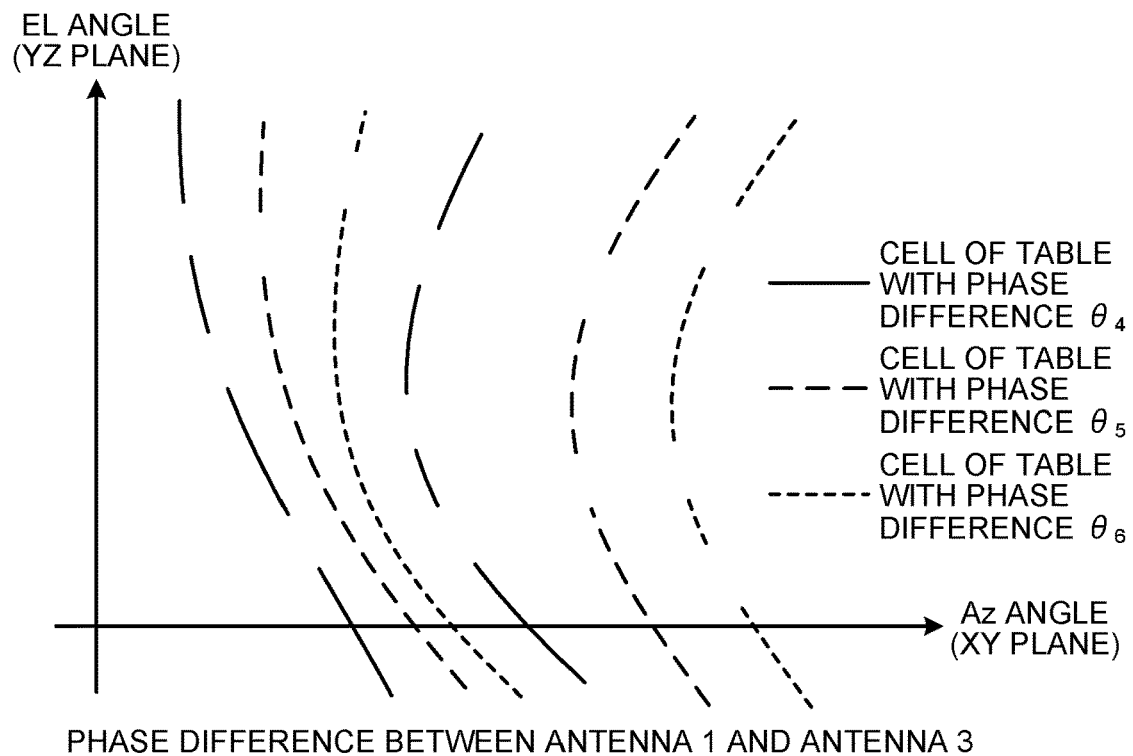
FIG. 7 is a graph indicating an example of the phase difference table.
Figure 8:
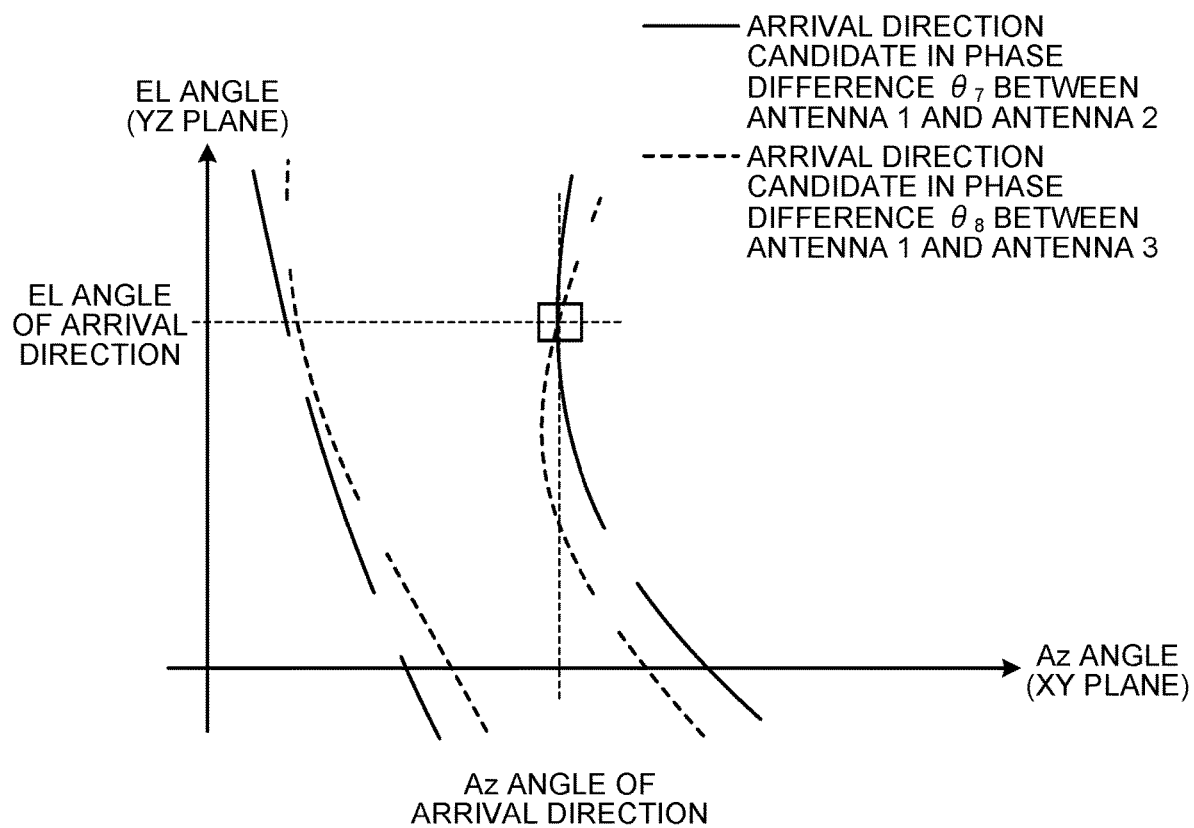
FIG. 8 is a graph on which received-wave arrival directions are superimposed.
Figure 9:
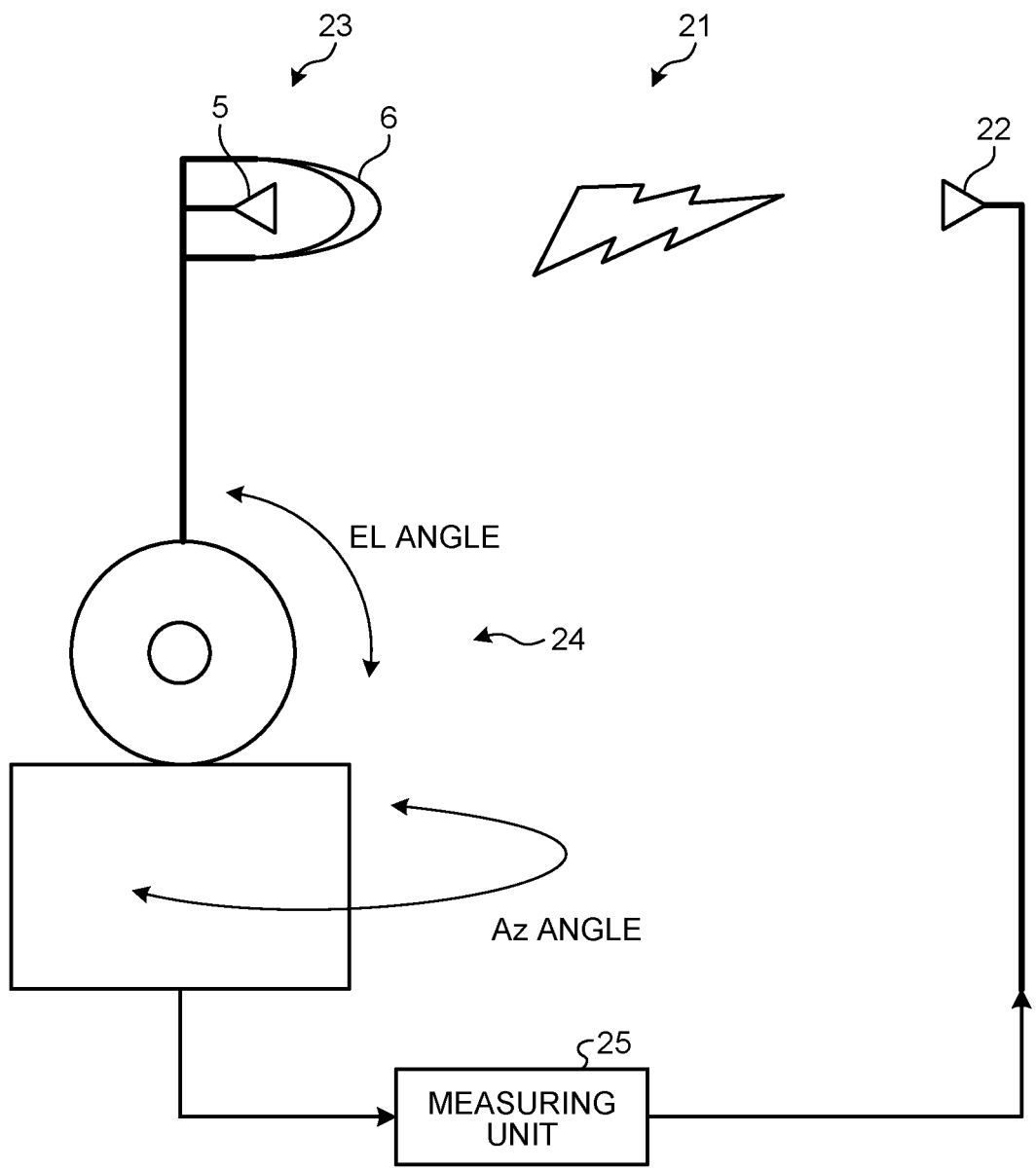
FIG. 9 is a schematic diagram of a device used in an acquisition method of the phase difference table.

FIG. 1 is a schematic diagram of part of the direction detection device according to the first embodiment. FIG. 2 is an A-A cross-sectional view of FIG. 1. FIG. 3 is a B-B cross-sectional view of FIG. 1. FIG. 4 is an explanatory diagram relating to the direction detection device and the direction detection method according to the first embodiment. FIG. 5 is a diagram of a phase difference table. FIG. 6 is a graph indicating an example of the phase difference table. FIG. 7 is a graph indicating an example of the phase difference table. FIG. 8 is a graph on which received-wave arrival directions are superimposed. FIG. 9 is a schematic diagram of a device used in an acquisition method of the phase difference table.

Direction Detection Device

As illustrated in FIGS. 1 to 3, the direction detection device 1 includes a plurality of antennas 5 and a radome 6. The antennas 5 are disposed in a linear fashion along the AZ direction (x-direction in FIG. 1) and are disposed at one location in the EL direction (z-direction in FIGS. 1 to 3), thereby having a one-dimensional arrangement. In the antennas 5, at least three antennas are disposed so that there are two or more combination patterns of the two antennas. The antennas 5 are arranged at predetermined distances in the AZ direction. In the first embodiment, distances between the antennas 5 are unequal, but they may be equal.

The radome 6 is disposed on a wing of an aircraft, for example. The radome 6 functions as the phase difference imparting unit that imparts phase differences in an AZ direction that is a one-dimensional direction, the phase differences being different depending on the received-wave arrival direction. Note that the AZ direction is a wing span direction of the wing of the aircraft. Specifically, the radome 6 has a shape that is non-uniform in a three-dimensional space including the AZ and EL directions. As illustrated in FIG. 2, a cross-sectional shape of the radome 6 cut at a position of a wing root side (left side of FIG. 1) in the AZ direction is such that the inner space is wider in the EL direction. In contrast, as illustrated in FIG. 3, a cross-sectional shape of the radome 6 cut at a position of a wing tip side (right side in FIG. 1) is such that the inner space is narrower in the EL direction. In a cross section also indicated in FIGS. 2 and 3, the thickness of the radome 6 is not constant, varying depending on the EL direction.

The radome 6 has a structure that is a laminate configuration, and the radome 6 may have different shapes, different laminate configurations, or both different shapes and laminate configurations so as to impart phase differences different depending on the received-wave arrival direction.

As illustrated in FIG. 4, the direction detection device 1 includes a detector 10, a storage unit 11, an extractor 12, and a comparator 13.

The detector 10 is connected to the antennas 5 and detects the phase difference, frequencies, and polarized waves of the received wave received by the antennas 5. The detector 10 detects the phase difference between the two antennas 5 as a phase difference. Here, in the first embodiment, three antennas of "Antenna 1", "Antenna 2" and "Antenna 3" are applied as the antennas 5. In this case, in the first embodiment, the detector 10 detects the phase differences between the "Antenna 1" and the "Antenna 2", and between the "Antenna 1" and the "Antenna 3", as the phase difference between the two antennas 5. The detector 10 may detect the phase difference between the "Antenna 2" and the "Antenna 3", or at least two or more patterns of phase difference depending on the combination pattern of the two antennas among the antennas 5. In the following, the direction detection device 1 and the direction detection method of the first embodiment are described on the basis of the combination of the "Antenna 1" and the "Antenna 2", and the "Antenna 1" and the "Antenna 3", but are not particularly limited to this combination, and may be applied as a direction detection device 1 and a direction detection method using phase differences of three or more patterns.

The storage unit 11 stores therein the phase difference table T illustrated in FIG. 5. The phase difference table T has data that associate the phase difference between the two antennas 5 with the received-wave arrival direction. In FIG. 5, the horizontal axis is the AZ angle and the vertical axis is the EL angle. The phase difference table T consists of a plurality of cells associated with the AZ and EL angles. Each cell has a phase difference associated therewith. Therefore, the AZ and EL angles are associated with the cells with which the phase differences are associated. The phase difference table T is prepared at least for each frequency or each polarized wave, and a phase difference table T corresponding to frequency, a phase difference table T corresponding to polarized wave, or a phase difference table T corresponding to frequency and polarized wave may be prepared. Furthermore, the phase difference table T is prepared for each combination of the two antennas. In other words, the first embodiment prepares, as phase difference tables T, a phase difference table T of the "Antenna 1" and the "Antenna 2", and a phase difference table T of the "Antenna 1" and the "Antenna 3". Although not illustrated in a figure, the storage unit 11 stores therein a program for detecting the received-wave arrival direction using the direction detection device 1. The phase difference table T includes not only the phase difference table T illustrated in FIG. 5, but also mathematical expressions based on the phase difference table T illustrated in FIG. 5 (for example, lines illustrated in FIGS. 6 and 7, which will be described later).

The extractor 12 extracts the received-wave arrival direction corresponding to the phase difference from the phase difference table T using the frequencies or the polarized waves of received waves detected by the detector 10, and the phase difference of the received waves. Specifically, in the first embodiment, the extractor 12 acquires the phase difference table T corresponding to the frequency, using the frequency of the received wave detected in the detector 10. Thereafter, the extractor 12 extracts the cells in the phase difference table T corresponding to the phase difference detected in the detector 10. The extractor 12 extracts the cells of the phase difference table T for each of the combination of the "Antenna 1" and the "Antenna 2" and the combination of the "Antenna 1" and the "Antenna 3".

The comparator 13 acquires the received-wave arrival direction in which a plurality of candidates for the arrival direction extracted by the extractor 12 match, as a detection result. Now, referring to FIGS. 6 to 8, the following specifically describes processing by the comparator 13. FIG. 6 and FIG. 7 are diagrams where the same values of the phase difference are drawn with virtual lines in the phase difference table T as illustrated in FIG. 5. FIG. 6 is a diagram drawing lines for phase difference $\theta_1$, phase difference $\theta_2$, and phase difference $\theta_3$ that are the phase difference between "Antenna 1" and "Antenna 2". FIG. 7 is a diagram drawing lines for phase difference $\theta_4$, phase difference $\theta_5$, and phase difference $\theta_6$ that are the phase difference between "Antenna 1" and "Antenna 3".

As illustrated in FIG. 8, upon acquiring the phase difference 67 between the "Antenna 1" and the "Antenna 2" extracted by the extractor 12, the comparator 13 acquires cells that fall within the phase difference $\theta_7$. As illustrated in FIG. 8, upon acquiring the phase difference $\theta_8$ between the "Antenna 1" and the "Antenna 3" extracted by the extractor 12, the comparator 13 acquires cells that fall within the phase difference $\theta_8$. Then, the comparator 13 acquires cells in which the cells that fall within the phase difference $\theta_7$ between the "Antenna 1" and the "Antenna 2" and the cells that fall within the phase difference $\theta_8$ between the "Antenna 1" and the "Antenna 3" match one another. The comparator 13 then acquires the AZ and EL angles corresponding to the acquired cells as detection results. In other words, the azimuth indicated by the combination of the AZ and EL angles indicated by the cells that match one another is an azimuth that causes the "Antenna 1" and the "Antenna 2" to generate the phase difference θ7 and at the same time, also causes the "Antenna 1" and the "Antenna 3" to generate the phase difference θ8, and matches an observation result, so that it is possible to estimate the azimuth as the received-wave arrival direction.

Phase Difference Table Acquisition Method

Next, referring to FIG. 9, the following describes the acquisition method of the phase difference table that is to acquire the phase difference table T used in the direction detection device 1. An acquisition device 21 illustrated in FIG. 9 is used to acquire the phase difference table T. The acquisition device 21 includes a transmitter 22, a receiver 23, an operating unit 24, and a measuring unit 25.

The transmitter 22 transmits radio waves that will become predetermined polarized waves toward the receiver 23. The receiver 23 is a receiver that mimics the antennas 5 and the radome 6 of the direction detection device 1, and acquires radio waves that the receiver 23 has received as received waves. The operating unit 24 moves the receiver 23 so that the position of the transmitter 22 viewed from the receiver 23 is at the predetermined AZ and EL angles. The measuring unit 25 sets a transmission frequency of the transmitter 22 and acquires the phase difference of the received wave received at the receiver 23, and also acquires the AZ angle and the EL angle at the time of the acquisition.

The acquisition method of the phase difference table T executes a step of causing the receiver 23 including the antennas 5 to operate the operating unit 24 so that the arrival direction has the predetermined AZ and EL angles. Thereafter, in the acquisition method, a step is executed in which a radio wave of a predetermined frequency is generated from the transmitter 22 serving as a radio wave source. The acquisition method then executes a step of receiving the radio wave of the predetermined frequency as a received wave by the receiver 23. In the acquisition method, when the receiver 23 receives the received wave, the measuring unit 25 measures the phase difference of the received wave. Then, in the acquisition method, a step is executed in which the measured phase difference between the two antennas 5 is associated with the AZ and EL angles at the time of acquisition, and a phase difference table T is acquired for each frequency and each polarized wave of the received wave. In the above-described acquisition method of the phase difference table T, the phase difference table T is acquired for each frequency and each polarized wave of the received wave, but the phase difference table T may be acquired only for each frequency or each polarized wave.

A plurality of the phase difference tables T prepared for each frequency or each polarized wave of the received waves may undergo an interpolation process in which the phase difference between the frequencies or the polarized waves is interpolated. Furthermore, each cell in the phase difference table T is associated with an arrival direction consisting of the AZ and EL angles, but an interpolation process may be performed in which the AZ and EL angles between cells are interpolated.

Direction Detection Method

Next, referring to FIG. 4, the following describes the direction detection method for detecting the received-wave arrival direction by the direction detection device 1.

The direction detection method first executes step S1 in which the antennas 5 arrayed in a one-dimensional direction receive received waves. Thereafter, in the direction detection method, step S2 is executed in which the detector 10 detects the phase difference and the frequencies or the polarized waves between the two antennas 5 using the received waves received by the antennas 5. Subsequently, in the direction detection method, step S3 is executed in which the extractor 12 acquires the phase difference table T corresponding to the detected frequencies or polarized waves, from the storage unit 11 using the detected frequencies or the polarized waves. Then, in the direction detection method, step S4 is executed in which the extractor 12 extracts, from the acquired phase difference table T, a plurality of cells corresponding to the received-wave arrival direction corresponding to the phase difference detected by the detector 10, that is, corresponding to the AZ angle and the EL angle, according to the combination of the two antennas 5. In the direction detection method, after the execution of step S4, step S5 is executed in which the acquired cells of the AZ and EL angles are compared one another in the comparator 13 and the AZ and EL angles of the cells that match are acquired as the detection results. In the direction detection method of the first embodiment, the phase difference table T is acquired on the basis of the frequencies or the polarized waves, but the phase difference table T may be acquired on the basis of the frequencies and the polarized waves.

Second Embodiment

Figure 10:
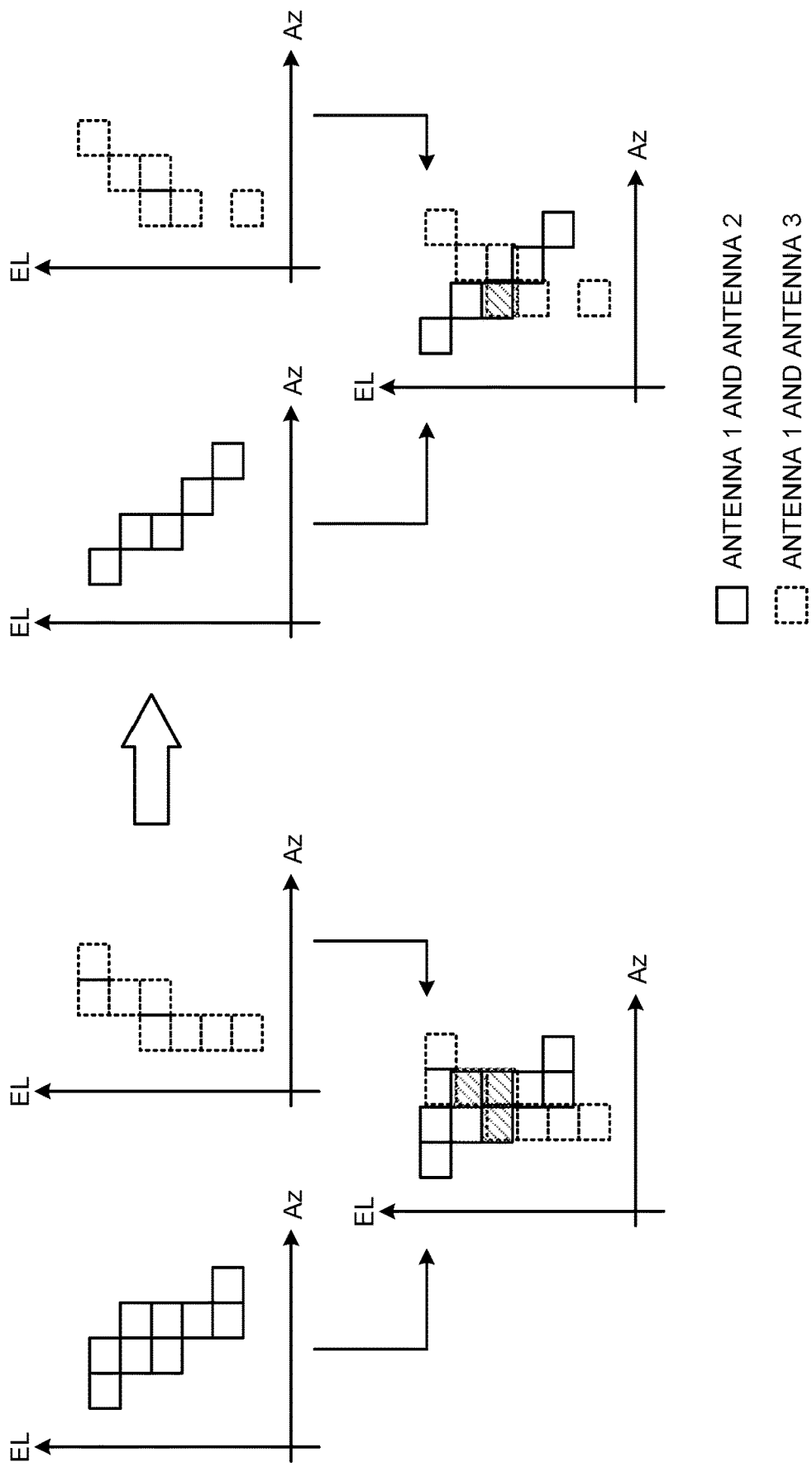
FIG. 10 is an explanatory diagram of an example relating to a direction detection device and a direction detection method according to a second embodiment.
Figure 11:
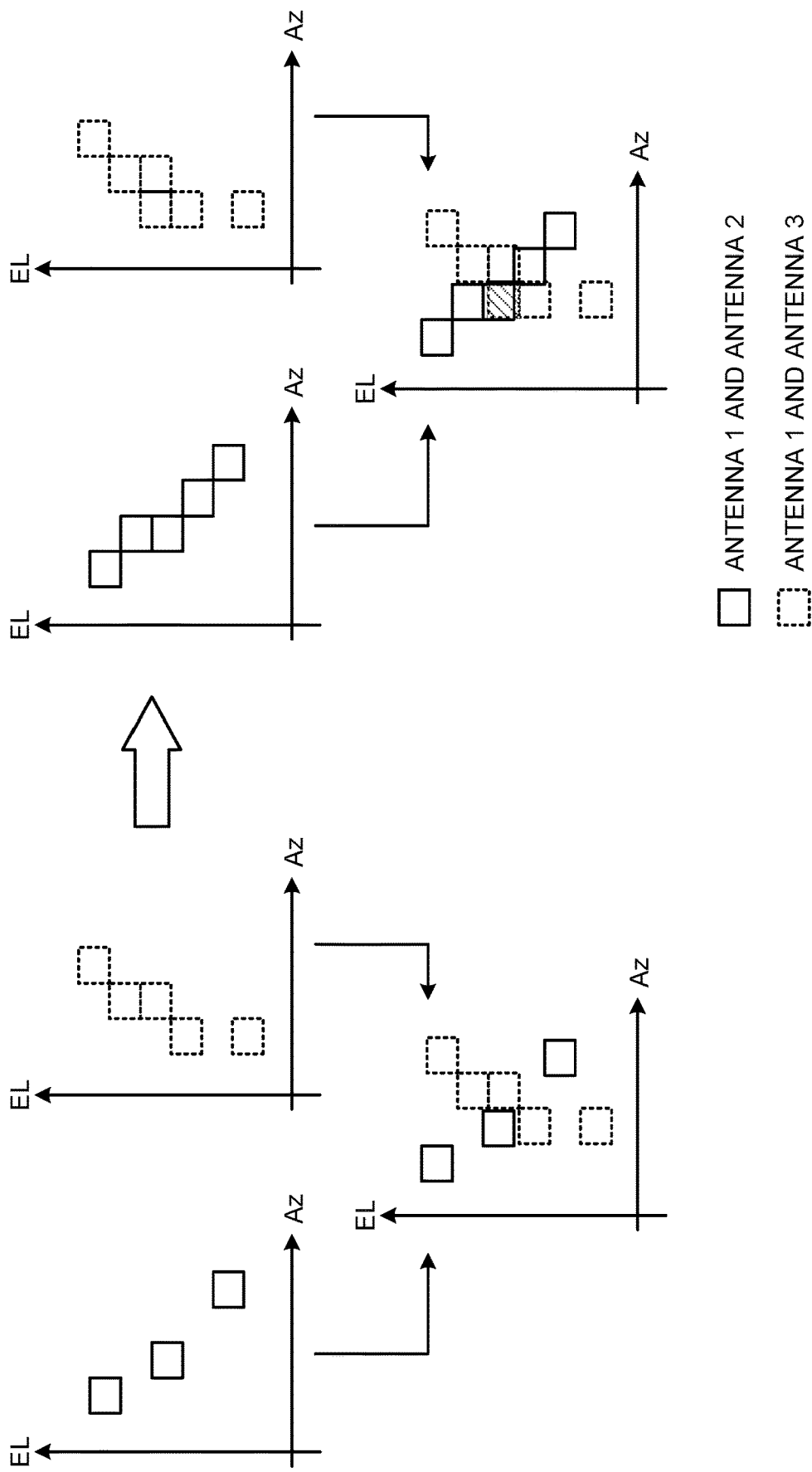
FIG. 11 is an explanatory diagram of an example relating to the direction detection device and the direction detection method according to the second embodiment.

Next, referring to FIGS. 10 and 11, the following describes the second embodiment. In order to avoid duplicate descriptions, part of the second embodiment that is different from the first embodiment is described, and part that has the same configuration as the first embodiment will be described with the same symbol. FIG. 10 is an explanatory diagram of an example relating to a direction detection device and a direction detection method according to the second embodiment. FIG. 11 is an explanatory diagram of an example relating to the direction detection device and the direction detection method according to the second embodiment.

In the direction detection method of the first embodiment, the extractor 12 extracts the cells corresponding to the phase difference detected by the detector 10 according to the combination of the two antennas 5. In this case, there may be more than one cell that match in the comparator 13, as illustrated on the left side of FIG. 10. In the comparator 13, there may be no cell that matches as illustrated on the left side of FIG. 11.

Thus, in the direction detection method of the second embodiment, the extractor 12 extracts the received-wave arrival direction corresponding to the phase difference width obtained by imparting the adjustment width ($\alpha$, $\beta$) to the phase difference $\theta$ detected by the detector 10. Specifically, the extractor 12, when acquiring the phase difference $\theta$ from the detector 10, generates "$\theta-\alpha<\theta<\theta+\beta$" as the phase difference width and acquires a cell corresponding to the generated phase difference width. Here, the extractor 12 reduces the number of cells to be acquired by decreasing an adjustment width ($\alpha$, $\beta$), or increases the number of cells to be acquired by increasing the adjustment width ($\alpha$, $\beta$). The adjustment width ($\alpha$, $\beta$) may be the same among the all antennas 5, or may be different among the antennas 5.

Specifically, as illustrated on the left side of FIG. 10, when the comparator 13 acquires and compares the cells that fall within the phase difference width between the "Antenna 1" and the "Antenna 2", and the cells that fall within the phase difference width between the "Antenna 1" and the "Antenna 3", resulting in more than one cell that match, the extractor 12 narrows the phase difference width. This narrowing reduces the number of the cells that fall within the phase difference width between the "Antenna 1" and the "Antenna 2", and the number of the cells that fall within the phase difference width between the "Antenna 1" 1 and the "Antenna 3". Then, the comparator 13 again acquires and compares the cells that fall within the phase difference width between the "Antenna 1" and the "Antenna 2" and the cells that fall within the phase difference width between the "Antenna 1" and the "Antenna 3", so as to be able to find cells that match, as illustrated on the right side of FIG. 10.

As illustrated on the left side of FIG. 11, the comparator 13 acquires and compares the cells that fall within the phase difference width between the "Antenna 1" and the "Antenna 2" and the cells that fall within the phase difference width between the "Antenna 1" and the "Antenna 3", resulting in no cells that match, that is, the cells are inconsistent, the extractor 12 widens the phase difference width. This widening increases the number of cells that fall within the phase difference width between the "Antenna 1" and the "Antenna 2", and the number of cells that fall within the phase difference width between the "Antenna 1" and the "Antenna 3". Then, the comparator 13 again acquires and compares the cells that fall within the phase difference width between the "Antenna 1" and the "Antenna 2" and the cells that fall within the phase difference width between the "Antenna 1" and the "Antenna 3", so as to be able to find cells that match, as illustrated on the right side of FIG. 11.

Third Embodiment

Figure 12:
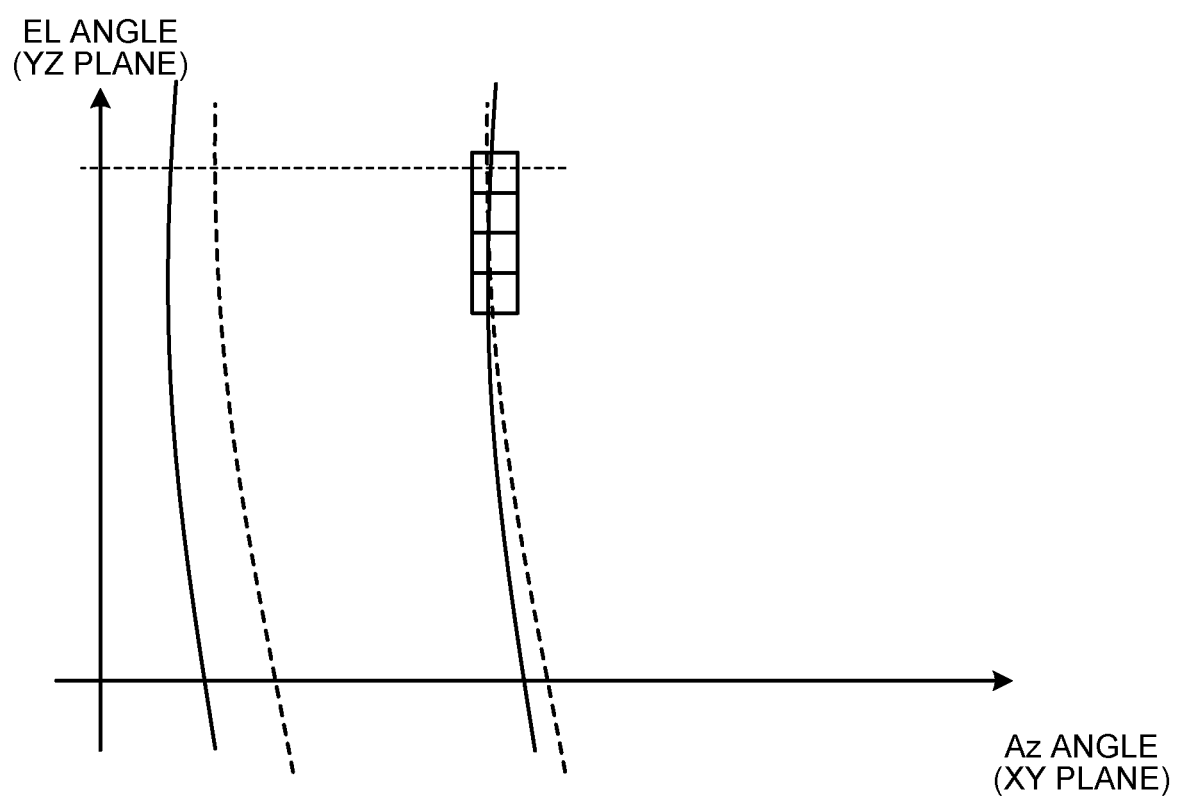
FIG. 12 is a graph on which received-wave arrival directions are superimposed in a direction detection device according to a third embodiment.
Figure 13:
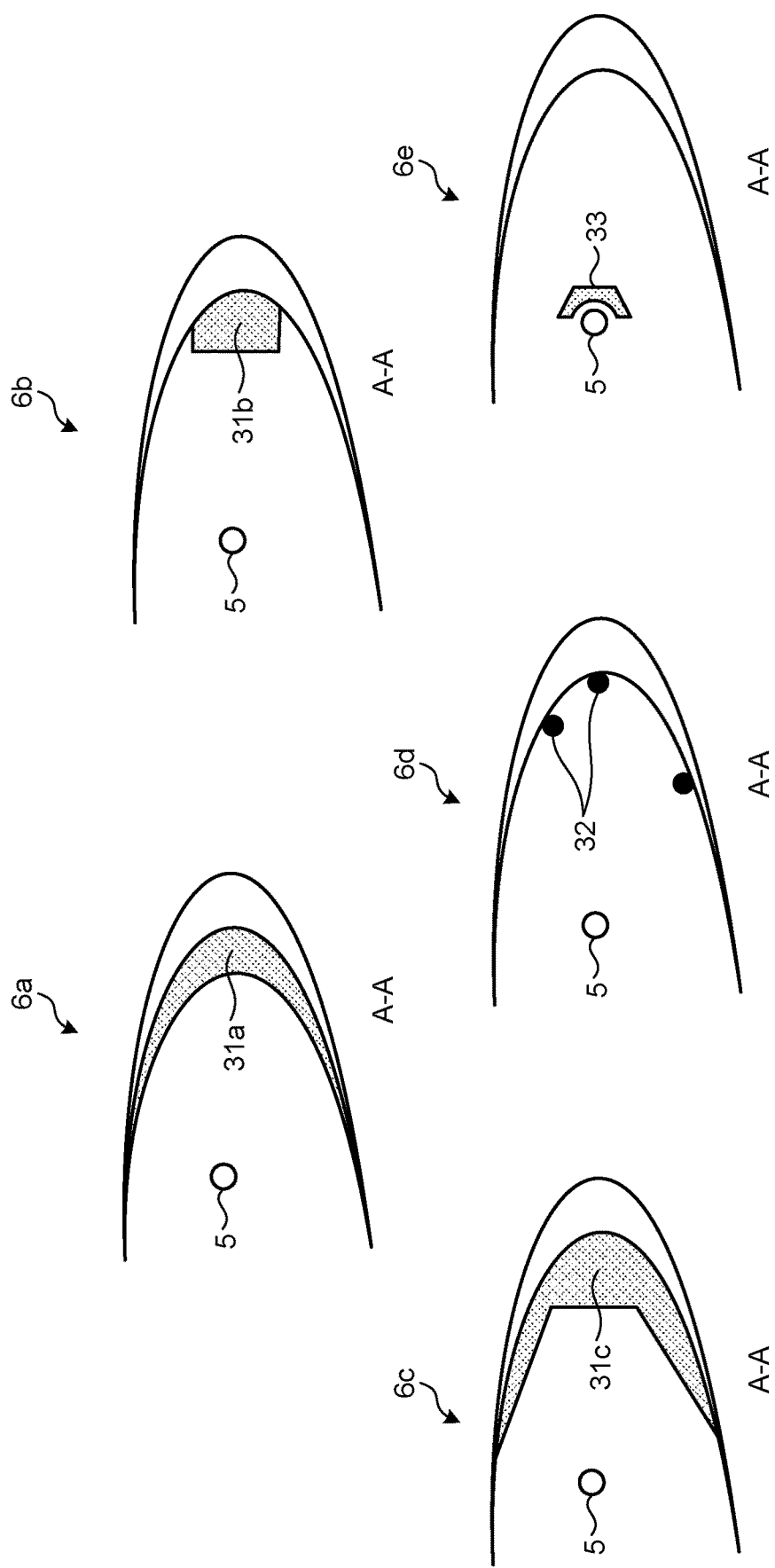
FIG. 13 is a cross-sectional view illustrating an example of a shape of a radome of the direction detection device according to the third embodiment.

Next, referring to FIGS. 12 and 13, the following describes the third embodiment. In order to avoid duplicate descriptions, part of the third embodiment that is different from the first and second embodiments is described, and part that has the same configuration as the first and second embodiments is described with the same symbol. FIG. 12 is a graph on which received-wave arrival directions are superimposed in the direction detection device according to the third embodiment. FIG. 13 is a cross-sectional view illustrating an example of a shape of the radome of the direction detection device according to the third embodiment.

In the direction detection method of the first embodiment, the extractor 12 extracts the cells corresponding to the phase difference detected by the detector 10 according to the combination of the two antennas 5. In this case, there may be a series of a plurality of cells that match in the comparator 13, as illustrated in FIG. 12. This is because the radome 6 has part to which phase differences different depending on the received-wave arrival direction is not imparted, or part in which the imparting is insufficient.

For this reason, the third embodiment has, as illustrated in FIG. 13, a configuration in which a dielectric 31 as an example of a material for changing electrical characteristics is added to the radome 6 of the direction detection device 1. In the dielectric 31, it is sufficient that phase differences different depending on the received-wave arrival direction are imparted, for example, dielectrics 31a to 31c, 32, and 33 in FIG. 13 may be arranged. In the radome 6a of FIG. 13, the dielectric 31a is disposed following the inside of the radome 6a, and the dielectric 31a has an inner surface that is a curved surface. In the radome 6b of FIG. 13, the dielectric 31b has a block shape that protrudes from the inside of the radome 6a. In the radome 6c of FIG. 13, the dielectric 31c is disposed following the inside of the radome 6c, the dielectric 31c has an inner surface the part of which facing the antenna 5 is a flat surface, and the flat surface has a surface connected to both sides in the EL direction, the surface also being a flat surface. In the radome 6d in FIG. 13, a separate dielectric 32 is attached to the inside of the radome 6a. In the radome 6e of FIG. 13, a dielectric 33 having a cap shape is attached to cover the antenna 5. Metal or other good conductor, besides dielectric, can be used as a material for changing the electrical characteristics.

Although not illustrated, a material for changing the electrical characteristics, such as a dielectric 31, may be arranged on the outside of the radome 6. For example, when the direction detection device 1 is mounted on an aircraft, an airframe on the outside of the radome 6 may be used as a material for changing the electrical characteristics. In other words, the airframe on the outside of the radome 6 may function as a phase difference imparting unit that imparts phase differences different depending on the received-wave arrival direction.

Fourth Embodiment

Figure 14:
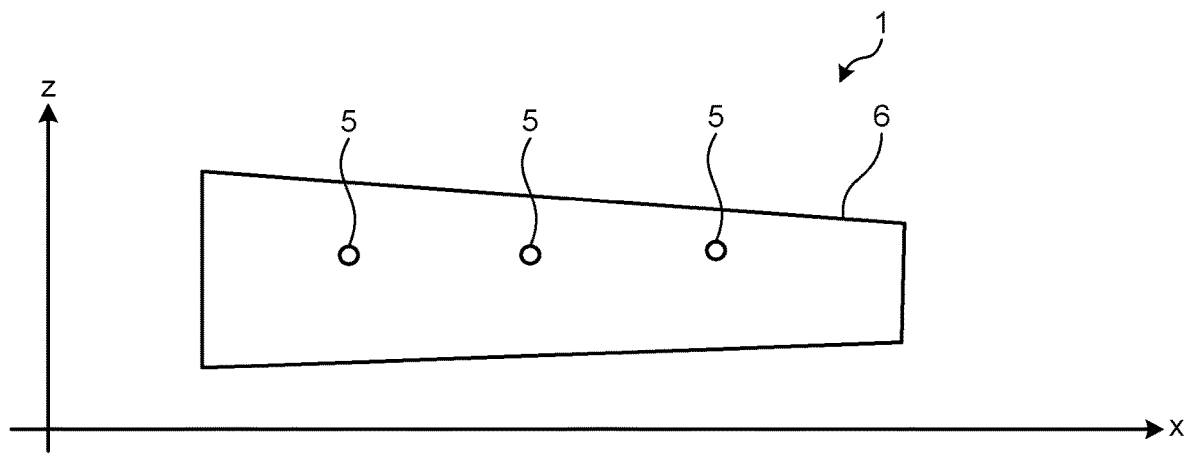
FIG. 14 is a schematic diagram illustrating an example of the arrangement of a plurality of antennas of a direction detection device according to a fourth embodiment.
Figure 15:
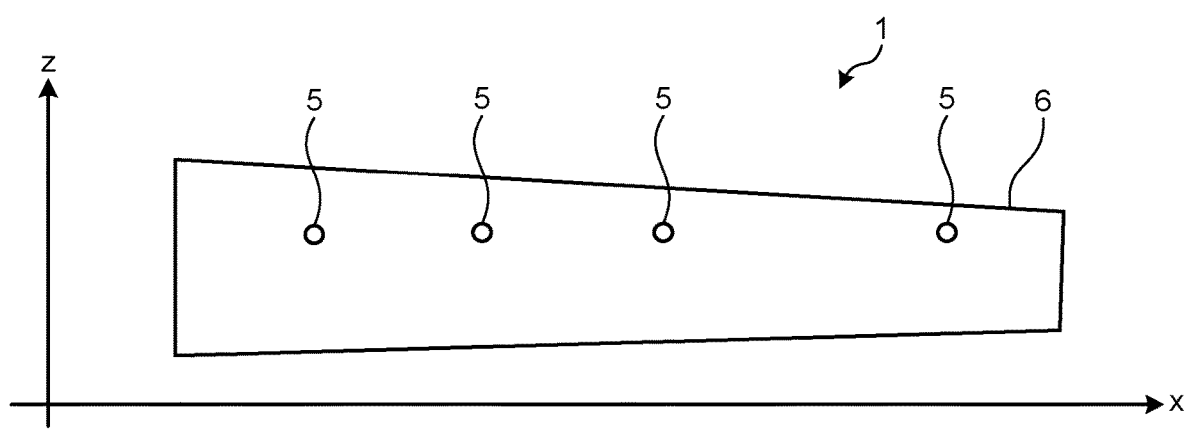
FIG. 15 is a schematic diagram illustrating an example of the arrangement of a plurality of antennas of the direction detection device according to the fourth embodiment.

Next, referring to FIGS. 14 and 15, the following describes the fourth embodiment. In order to avoid duplicate descriptions, part of the fourth embodiment that is different from the first to third embodiments is described, and part that has the same configuration as the first to third embodiments is described with the same symbol. FIG. 14 to FIG. 17 are schematic diagrams illustrating an example of the arrangement of the antennas of the direction detection device according to the fourth embodiment.

In the first embodiment, the three antennas 5 are arranged at unequal intervals in the AZ direction, but they may be arranged at equal intervals as illustrated in FIG. 14. This is because in the direction detection method using the phase difference table T, ambiguity is canceled by imparting different phase differences with the phase difference imparting unit, and thus there are no restrictions that distances between the antennas 5 are made unequal. As illustrated in FIG. 15, four antennas may be arranged as a plurality of the antennas 5. In this case, the distances between the antennas 5 may be unequal or equal.

Figure 16:
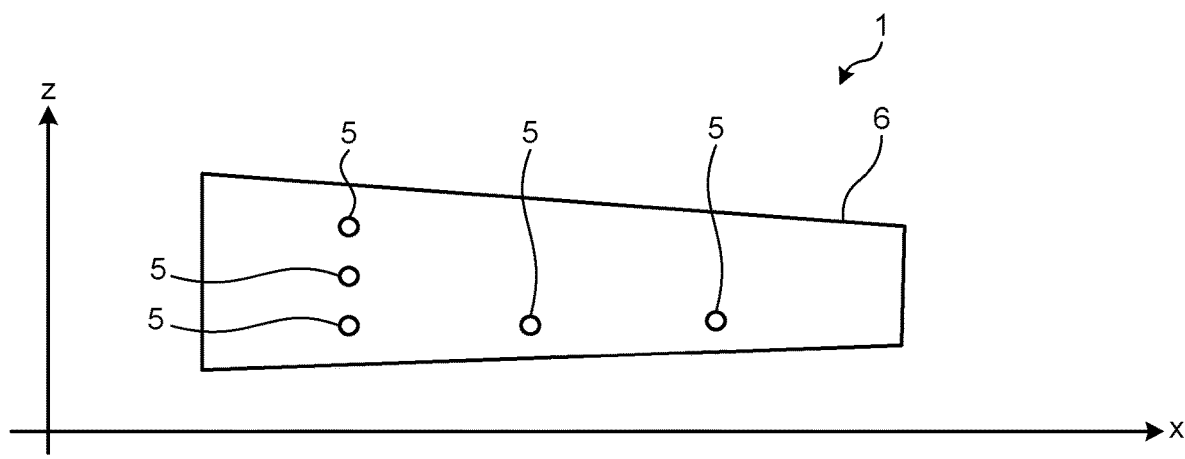
FIG. 16 is a schematic diagram illustrating an example of the arrangement of a plurality of antennas of the direction detection device according to the fourth embodiment.
Figure 17:
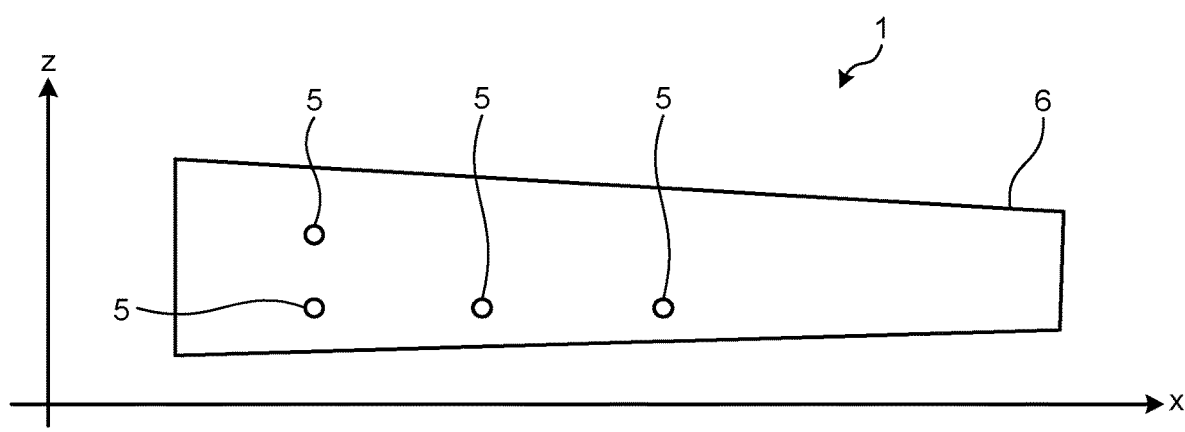
FIG. 17 is a schematic diagram illustrating an example of the arrangement of a plurality of antennas of the direction detection device according to the fourth embodiment.

Furthermore, as illustrated in FIG. 16 and FIG. 17, the plurality of antennas 5 may be arranged in a two-dimensional arrangement in which some of the antennas 5 are arranged in one direction (for example, in the AZ direction) and others thereof arranged in another direction (for example, in the EL direction) that crosses the one direction. FIG. 16 illustrates the three antennas 5 arranged in the EL direction, and FIG. 17 illustrates the two antennas 5 arranged in the EL direction. Such two-dimensional arrangements, even when the antennas 5 are in a conventional arrangement, make it possible to resolve ambiguity more efficiently by applying the direction detection method using the phase difference table T.

The first to fourth embodiments have a configuration in which the received-wave arrival direction is detected using the phase difference table T, in which the phase difference in each cell is acquired, while changing the AZ and EL angles, but are not particularly limited to this configuration. For example, the first to fourth embodiments may have a configuration in which, while the radome 6 is being deformed under load, the phase difference in each cell is acquired to generate a phase difference table T, and the received-wave arrival direction is detected using the generated phase difference table T, considering the deformation of the radome 6 under load.

As in the foregoing, the direction detection device 1, the acquisition method of the phase difference table T, the direction detection method, and the direction detection program described in the embodiments are understood, for example, as follows.

In the direction detection device 1 according to the first aspect, the direction detection device 1 that detects a received-wave arrival direction includes: a plurality of antennas 5 that receive the received wave and are arrayed in at least a one-dimensional direction; a phase difference imparting unit (radome 6, dielectric 31, and good conductor) that imparts phase differences different depending on the received-wave arrival direction to the antennas 5; a storage unit 11 that stores therein a phase difference table T in which the phase difference between the two antennas 5 among the antennas 5 is associated with the received-wave arrival direction, for each combination of the two antennas 5; a detector 10 that detects the phase difference between the two antennas 5 using the received wave received in the antennas 5; an extractor 12 that extracts a plurality of the received-wave arrival directions corresponding to the phase difference detected by the detector 10 from the phase difference table T stored in the storage unit 11, according to the combinations of the two antennas 5; and a comparator 13 that compares the received-wave arrival directions corresponding to a plurality of the phase differences acquired from the extractor 12 and acquires the received-wave arrival directions that match as a detection result.

With this configuration, even when the antennas 5 are arranged in a one-dimensional direction because of physical restrictions in the internal space of the radome 6, by using the phase difference table T, it is possible to eliminate ambiguity and suitably acquire a three-dimensional arrival direction of the received wave.

In the second aspect, the phase difference table T is stored for each frequency or for each polarized wave of the received wave, the detector 10 detects the frequency or the polarized wave of the received wave, and the extractor 12 acquires the phase difference table T corresponding to the frequency or the polarized wave using the frequency or the polarized wave detected by the detector 10, and extracts from the acquired phase difference table T the received-wave arrival direction corresponding to the phase difference detected by the detector 10.

With this configuration, since the phase difference table T can be acquired for each frequency or each polarized wave, the appropriate phase difference corresponding to the frequency and the polarized wave can be acquired, and the received-wave arrival direction with good accuracy corresponding to the phase difference can be extracted.

In the third aspect, the phase difference imparting unit has a radome that houses the antennas, and the radome has a non-uniform shape or a non-uniform structure in three-dimensional space.

With this configuration, the radome 6 has a non-uniform shape or a non-uniform structure in a three-dimensional space, so that it is possible to impart phase differences different depending on the received-wave arrival direction.

In the fourth aspect, the phase difference imparting unit is disposed in the radome 6 that houses the antennas 5, and has a material that changes the electrical characteristics (dielectric 31, good conductor).

With this configuration, a material that changes the electrical characteristics is disposed in the radome 6, so that it is possible to easily impart phase differences different depending on the received-wave arrival direction.

In the fifth aspect, a plurality of the antennas 5 are disposed in the one-dimensional direction at equal intervals.

With this configuration, even when the antennas 5 are disposed at equal intervals, it is possible to resolve ambiguity, thereby allowing a high degree of freedom in the arrangement of the antennas 5.

In the sixth aspect, the one-dimensional direction is the azimuthal direction, and a plurality of the antennas 5 are in a single row arrangement in the azimuthal direction, in which the antennas 5 are each disposed at one location in the elevation angle direction orthogonal to the azimuthal direction.

With this configuration, even when the interior space of the radome 6 is narrow in the elevation angle direction, the antennas 5 can be appropriately arranged.

In the seventh aspect, the extractor 12 extracts the received-wave arrival direction corresponding to the phase difference width obtained by imparting an adjustment width to the phase difference detected by the detector 10, and the comparator 13, when the candidates for the received-wave arrival direction corresponding to a plurality of the phase difference widths extracted according to the combination do not match, widens the adjustment width, whereas when there are a plurality of candidates for the received-wave arrival direction that match, narrows the adjustment width.

With this configuration, the adjustment width is adjusted, so that it is possible to appropriately find a received-wave arrival direction that matches.

In the eighth aspect, the received-wave arrival direction is specified by the AZ angle, which is an angle in the azimuthal direction, and the EL angle, which is an angle in the elevation direction orthogonal to the azimuthal direction, and the phase difference table has a plurality of cells corresponding to the AZ angle and the EL angle, and in the phase difference table, the phase differences are respectively set in the cells, and the phase difference between the cells is interpolated.

With this configuration, the phase difference between cells can be interpolated appropriately, so that it is possible to accurately acquire the phase difference and appropriately acquire the received-wave arrival direction corresponding to the phase difference.

In the ninth aspect, when the phase difference table is prepared for each frequency or each polarized wave of the received wave, in the phase difference table, the phase difference between the frequencies or the phase difference between the polarized waves is interpolated.

With this configuration, the phase difference between frequencies and between polarized waves can be appropriately interpolated, so that it is possible to accurately acquire the phase difference between the frequencies and the polarized waves, and appropriately acquire the received-wave arrival direction corresponding to the phase difference.

The acquisition method of a phase difference table T according to the tenth aspect is an acquisition method of a phase difference table T for acquiring a phase difference table T used in the direction detection devices 1 described above, the method executing: a step of setting the received wave generated from a radio wave source (transmitter 22) for a plurality of antennas 5 that are arrayed in at least a one-dimensional direction, to be in a predetermined arrival direction; a step of generating the received wave from the radio wave source; a step of receiving the received wave in the antennas 5; and a step of acquiring a phase difference table T in which the phase difference between the two antennas 5 is associated with the received-wave arrival direction, using the phase difference acquired by receiving the received wave.

With this configuration, it is possible to acquire the phase difference table T that appropriately associate the phase difference with the received-wave arrival direction.

The direction detection method according to the eleventh aspect is a direction detection method for detecting a received-wave arrival direction of a received wave by the direction detection device 1 described above, the method executing: step S1 of receiving the received wave by a plurality of antennas 5 that are arrayed in at least a one-dimensional direction; step S2 of detecting, in the detector 10, a phase difference between the two antennas 5 using the received wave received by the antennas 5; steps S3 and S4 of extracting, in the extractor 12, a plurality of the received-wave arrival directions corresponding to the phase difference detected by the detector 10 from the phase difference table T stored in the storage unit 11, according to combinations of the two antennas 5; and step S5 of comparing, in the comparator 13, the received-wave arrival directions corresponding to a plurality of the acquired phase differences, and acquiring the received-wave arrival directions that match as detection results.

With this configuration, even when the antennas 5 are arranged in a one-dimensional direction because of physical restrictions in the internal space of the radome 6, by using the phase difference table T, it is possible to eliminate ambiguity and suitably acquire a three-dimensional arrival direction of the received wave.

The direction detection program according to the twelfth aspect is a direction detection program for detecting a received-wave arrival direction of a received wave that is executed by the direction detection device 1 described above, the direction detection program causing the direction detection device 1 to execute: step S1 of receiving the received wave by a plurality of antennas 5 that are arrayed in at least a one-dimensional direction; step S2 of detecting, in the detector 10, a phase difference between the two antennas 5 using the received wave received by the antennas 5; steps S3 and S4 of extracting, in the extractor 12, a plurality of the received-wave arrival directions corresponding to the phase difference detected by the detector 10 from the phase difference table T stored in the storage unit 11, according to combinations of the two antennas 5; and step S5 of comparing, in the comparator 13, the received-wave arrival directions corresponding to a plurality of the acquired phase differences, and acquiring the received-wave arrival directions that match as detection results.

With this configuration, even when the antennas 5 are arranged in a one-dimensional direction because of physical restrictions in the internal space of the radome 6, by using the phase difference table T, it is possible to eliminate ambiguity and suitably acquire a three-dimensional arrival direction of the received wave.

REFERENCE SIGNS LIST

1 Direction detection device
5 Antenna
6 Radome
10 Detector
11 Storage unit
12 Extractor
13 Comparator
21 Acquisition device
22 Transmitter
23 Receiver
24 Operating unit
25 Measuring unit
31*a* to 31*c*, 32, 33 Dielectric
T Phase difference table

The invention claimed is:

1. A direction detection device that detects an arrival direction of a received wave, the device comprising:
   a plurality of antennas that are arrayed in at least a one-dimensional direction to receive the received wave;
   a phase difference imparting unit that imparts phase differences different depending on arrival directions of received waves to the antennas;
   a storage unit that stores therein a phase difference table in which for each of combinations of two antennas among the antennas, a phase difference between the two antennas is associated with an arrival direction of a received wave;
   a detector that detects a phase difference between two antennas based on the received wave received at the antennas;
   an extractor that extracts, for the combinations of two antennas, a plurality of arrival directions of the received wave corresponding to the phase differences detected by the detector from the phase difference table stored in the storage unit; and
   a comparator that compares the arrival directions of the received wave corresponding to the phase differences acquired from the extractor to acquire a matched arrival direction of the received wave as a detection result.

2. The direction detection device according to claim 1, wherein
   the phase difference table is stored for each frequency or for each polarization of the received wave,
   the detector detects the frequency or the polarization of the received wave, and
   the extractor acquires the phase difference table for the frequency or the polarization based on the frequency or the polarization detected by the detector, and extracts from the acquired phase difference table the arrival directions of the received wave corresponding to the phase differences detected by the detector.

3. The direction detection device according to claim 1, wherein
   the phase difference imparting unit has a radome that houses the antennas, and
   the radome has a non-uniform shape or a non-uniform structure in three-dimensional space.

4. The direction detection device according to claim 1, wherein the phase difference imparting unit is disposed in a radome that houses the antennas, and has a material that changes electrical characteristics.

5. The direction detection device according to claim 1, wherein the plurality of antennas includes antennas that are disposed in the one-dimensional direction at equal intervals.

6. The direction detection device according to claim 1, wherein
   the one-dimensional direction is an azimuthal direction, and
   the plurality of antennas are in a single row arrangement in the azimuthal direction, in which the antennas are each disposed at one location in an elevation angle direction orthogonal to the azimuthal direction.

7. The direction detection device according to claim 1, wherein
   the extractor extracts the arrival directions of the received wave corresponding to phase difference widths obtained by imparting an adjustment width to the phase differences detected by the detector, and
   the comparator, when there are no matched candidates for the arrival direction of the received wave corresponding to the phase difference widths extracted for the combinations, widens the adjustment width, whereas when there are a plurality of matched candidates for the arrival direction of the received wave, narrows the adjustment width.

8. The direction detection device according to claim 1, wherein
   the arrival direction of the received wave is specified by an AZ angle that is an angle in an azimuthal direction, and an EL angle that is an angle in an elevation direction orthogonal to the azimuthal direction, and
   the phase difference table has a plurality of cells associated with the AZ angle and the EL angle, and in the phase difference table, a corresponding phase difference is respectively set in each of the cells, and phase differences between the cells are interpolated.

9. The direction detection device according to claim 1, wherein when the phase difference table is prepared for each frequency or each polarization of the received wave, in the phase difference table, phase differences between the frequencies or phase differences between the polarizations are interpolated.

10. An acquisition method of a phase difference table for acquiring the phase difference table used in the direction detection device according to claim 1, the method comprising:
   setting a radio wave source so that the received wave which is generated from the radio wave source and is received by a plurality of antennas that are arrayed in at least a one-dimensional direction, is in a predetermined arrival direction;
   generating the received wave from the radio wave source;
   receiving the received wave at the antennas; and
   acquiring, based on a phase difference acquired by receiving the received wave, a phase difference table in which the phase difference between two antennas is associated with an arrival direction of the received wave.

11. A direction detection method for detecting an arrival direction of a received wave by the direction detection device according to claim 1, the method comprising:
receiving the received wave by a plurality of antennas that are arrayed in at least a one-dimensional direction;
detecting, by the detector, a phase difference between two antennas based on the received wave received at the antennas;
extracting, by the extractor, for combinations of two antennas, a plurality of arrival directions of the received wave corresponding to the phase differences detected by the detector from the phase difference table stored in the storage unit; and
comparing, by the comparator, the arrival directions of the received wave corresponding to the phase differences acquired to acquire a matched arrival direction of the received wave as a detection result.

12. A non-transitory computer-readable storage medium storing a direction detection program for detecting an arrival direction of a received wave to be executed by the direction detection device according to claim 1, the program causing the direction detection device to execute:
receiving the received wave by a plurality of antennas that are arrayed in at least a one-dimensional direction;
detecting, by the detector, a phase difference between two antennas based on the received wave received at the antennas;
extracting, by the extractor, for combinations of two antennas, a plurality of arrival directions of the received wave corresponding to the phase differences detected by the detector from the phase difference table stored in the storage unit; and
comparing, by the comparator, the arrival directions of the received wave corresponding to the phase differences acquired to acquire a matched arrival direction of the received wave as a detection result.

* * * * *